Dec. 14, 1948.   W. A. BOUGHTON ET AL   2,456,251
COMPOSITE BONDED SHEET INSULATING MATERIALS
Filed March 15, 1944
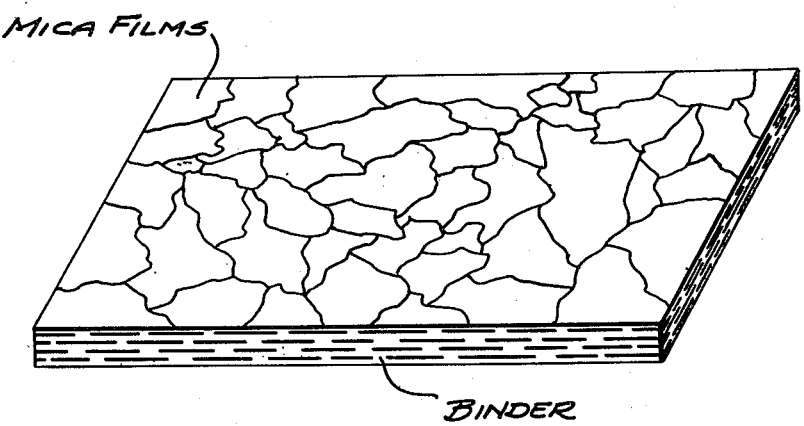
INVENTORS
WILLIS A. BOUGHTON
CHESTER L. DAWES
WILLIAM R. MANSFIELD
BY J. Stanley Churchill
ATTORNEY Patented Dec. 14, 1948

2,456,251

UNITED STATES PATENT OFFICE 2,456,251

COMPOSITE BONDED SHEET INSULATING MATERIALS

Willis A. Boughton, Fort Lauderdale, Fla., and Chester L. Dawes and William R. Mansfield, Cambridge, Mass., assignors to Willis A. Boughton, Chester L. Dawes, William R. Mansfield, Frank C. Hughes, and Donald M. Hill, trustees of the Mica Patents Trust Application March 15, 1944, Serial No. 526,614

5 Claims. (Cl. 154—2.6)

This invention relates to bonded mica insulation prepared in the form of sheets, rolls, tapes and moulded articles, characterized by marked and significant improvements in electrical insulating properties in resistance to more elevated temperatures without thermal deterioration, and other desirable qualities, over such products as are heretofore available.

The object of the invention is to produce a novel and highly useful bonded mica insulation embodying a novel and highly efficient high temperature resisting mica binder, by which the bonded mica insulation has imparted to it important properties and characteristics which render it more suitable for various commercial and industrial purposes, as will hereinafter be described, and particularly for use under high temperature conditions, than other prior bonded mica insulation of which we are aware.

With this object in view, and such others as may hereinafter appear, the invention consists in the bonded mica insulation, hereinafter described and particularly defined in the claims at the end of this specification.

The drawing illustrates a sheet of bonded mica insulation embodying the invention.

In general, the present invention contemplates the production of a novel and superior bonded mica insulation comprising a plurality of layers, at least one of which comprises a layer of mica flakes, and a novel and superior binder for binding the mica flakes to each other and the component layers into an integral unitary sheet. The novel mica binder comprises a modified resinous material particularly characterized among other respects by a substantial silica content. It is preferably produced by incorporating a minor but substantial proportion of ethyl silicate in a resinous binder material having as its base one or more resins selected from the group consisting of polymerized vinyl acetate, partially hydrolyzed polymerized vinyl acetate, polymerized acrylic ester resins and polymerized styrene resins. The proportions of the selected resin or resins to ethyl silicate may be varied within a substantial range, depending upon the particular use for which the mica insulation is intended, but for the production of bonded mica insulation for most industrial purposes we have found that the preferred range comprises a minor proportion of ethyl silicate up to about 32 per cent by weight of the same to the weight of the resinous material; or calculated on the basis of silica content, up to about 10 per cent by weight. For some purposes, however, the proportion by weight of ethyl silicate may be increased up to about 160 per cent; or calculated on the basis of silica content, up to about 50 per cent by weight. The mica binder may be plasticized by incorporation therein of any of the known resin plasticizers, such as dicarbitol phthalate and the other known equivalents thereof.

For purposes of illustration and convenience of description, the construction of the bonded mica insulation will be described in connection with the production of such insulation composed entirely of successive layers of mica flakes, although it will be understood that for certain purposes some of the layers may comprise other materials, as will be described. In constructing the bonded mica insulation, the generally accepted commercial methods now employed in the layering of the mica flakes, in the application of the binder, and in the heating and pressing of the assembly may be followed with good results.

After extensive experiment and test, we have found that the adhesion and bonding to the mica surface of the ethyl silicate modified resinous film is materially greater than the adhesion thereto of a film of the unmodified resin, and in addition it has been found that the hardness of the new mica binder film is materially greater than that of the film of unmodified resin. The softening point of the modified resinous film is substantially elevated as compared to the softening point of the unmodified resinous film, and the composite bonded mica insulation produced as above described with the ethyl silicate modified resinous film possesses substantially higher electrical resistivity than comparable insulation produced with the unmodified resinous bonding agent.

Another important characteristic imparted to the composite bonded mica by the present modified resinous film results from the incorporation of an inorganic component into the resinous film, and this proves extremely useful in resisting decomposition and deterioration of the insulation when the latter is subjected to temperatures exceeding the decomposition temperatures of the organic component of the resinous binder.

From a consideration of the chemical composition and properties of the ethyl silicate, together with those of the resin, it is believed that the unexpected modification of the resin results from one or more and possibly all of the following reactions: the resin, such as polyvinyl acetate, may react with the ethyl silicate to produce a polyvinyl silicate and ethyl acetate, the latter being evolved as a gas during the heating operation. The reaction may proceed according to the following:

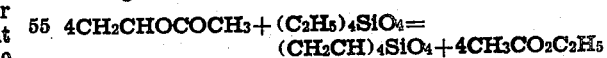

Ethyl silicate is a colorless, faintly odored liquid, boiling at 165° C., and in the presence of water it slowly hydrolyzes, yielding alcohol and silicic acid, and the latter in turn may be more or less dehydrated under heat and converted into the form of an adhesive silica. There are three types of ethyl silicate available commercially, differing from one another only in the combined silica content. Tetraethyl orthosilicate has 28.8 per cent combined silica. The second type, available is so-called condensed ethyl silicate, containing 31.5 per cent combined silica. The last type is the polyethyl silicate, containing 34 per cent combined silica. The three types are easily hydrolyzed with water to silicic acid, and the latter, as above stated, may be dehydrated in varying stages into an adhesive form of silica.

The modification of the polyvinyl acetate resin to impart to it the superior properties and characteristics as above described, which are particularly useful in the production of composite bonded mica insulation, may result from the ester interchange reaction, or from the hydrolysis of the ethyl silicate and the subsequent dehydration of the silicic acid, but more probably the desirable results are produced by combinations of these reactions. The hydrolysis of the ethyl silicate may be effected by the water normally contained in the alcohol, in which the resin is dissolved, but it is preferred to first partially hydrolyze the ethyl silicate in accordance with the following formulation: ethyl silicate, 50 volumes; water, 1 volume; denatured alcohol, 30 volumes. After permitting the foregoing to stand for a substantial length of time, as, for example, twenty-four hours, additional water is added to the extent of approximately 9 volumes.

In order to speed up the hydrolysis, the following formulation may be used: ethyl silicate, 8 volumes; water, 1 volume; acetone, 1 or 2 volumes; and a few drops of mineral acid such as hydrochloric acid. The hydrolysis proceeds rapidly, producing an ethyl silicate bonding medium which may be used in accordance with the present invention for incorporation into a solution of polyvinyl acetate resin to produce the improved mica binder.

Preferably a base solution is first formed by dissolving 2 pounds of polyvinyl acetate resin in 1 gallon of denatured alcohol, yielding 1.2 gallons of base solution. A binder solution is then produced by adding to 0.4 gallon of this base solution 0.6 gallon of alcohol, yielding 1 gallon of binder solution. Thus, 1 gallon of binder solution contains $0.4/1.2 \times 2 = 0.67$ pound of resin, or 3,784 cc. contains 303 grams of resin, so that 1000 cc. of binder solution contains 80 grams of resin.

The ethyl silicate employed was the condensed ethyl silicate having a specific gravity of 0.933, containing 31.5 per cent combined $SiO_2$, so that 1 cc. contains 0.2939 gram of combined $SiO_2$.

The effects of varying proportions of ethyl silicate to resin in the mica binder solution were studied, and the following table sets forth the proportions of materials employed:

Table 1

| Vol. Binder Soln. | Resin Content | Ethyl Silicate | | Percent by Wt. Ethyl Silicate to Resin | Weight Combined $SiO_2$ | Percent by Wt. $SiO_2$ to Resin |
|---|---|---|---|---|---|---|
| | | Volume | Weight | | | |
| Cc. | G. | Cc. | G. | Percent | G. | Percent |
| 1,000 | 80 | 0 | 0 | | | |
| 1,000 | 80 | 2.72 | 2.54 | 3.17 | 0.8 | 1 |
| 1,000 | 80 | 5.44 | 5.08 | 6.35 | 1.6 | 2 |
| 1,000 | 80 | 13.61 | 12.7 | 15.87 | 4 | 5 |
| 1,000 | 80 | 27.22 | 25.4 | 31.75 | 8 | 10 |
| 1,000 | 80 | 54.44 | 50.8 | 63.50 | 16 | 20 |
| 1,000 | 80 | 90.67 | 84.6 | 105.67 | 26.67 | 33⅓ |
| 1,000 | 80 | 136.1 | 127.0 | 158.67 | 40 | 50 |

It was found during the research that satisfactory modified polyvinyl resin mica binder solutions were produced utilizing varying percentages of ethyl silicate up to approximately 160 per cent by weight of ethyl silicate to resin. This corresponds to a percentage by weight of 50 per cent $SiO_2$ to resin. Above this critical point the bonding characteristics and the efficiency of the binder solution tended to diminish, interfering with the most successful use of the binder in the production of the composite mica insulation.

The foregoing formulation is recommended for the production of a thermoplastic composite mica insulation. For some purposes it is desirable to increase the flexibility of the composite mica insulation, and the following formulation is recommended for the production of this character of flexible composite mica insulation.

To produce a flexible modified polyvinyl acetate resin binder, we recommend that to 5,000 cc. of the base solution refered to in the above formulation, alcohol be added to the amount of 6000 cc. together with 700 cc. of dicarbitol phthalate. This yields 11,700 cc. of flexible binder solution, so that 1000 cc. of this flexible binder solution contains 50 grams of resin. The following table indicates the proportions of components:

Table 2

| Vol. Binder Soln. | Resin Content | Ethyl Silicate | | Percent by Wt. Ethyl Silicate to Resin | Weight Combined $SiO_2$ | Percent by Wt. $SiO_2$ to Resin |
|---|---|---|---|---|---|---|
| | | Volume | Weight | | | |
| Cc. | G. | Cc. | G. | Percent | G. | Percent |
| 1,000 | 50 | 0 | 0 | | 0 | |
| 1,000 | 50 | 1.70 | 1.58 | 3.17 | 0.5 | 1 |
| 1,000 | 50 | 3.41 | 3.17 | 6.34 | 1.0 | 2 |
| 1,000 | 50 | 8.50 | 7.94 | 15.88 | 2.5 | 5 |
| 1,000 | 50 | 17.04 | 15.87 | 31.74 | 5.0 | 10 |
| 1,000 | 50 | 34.08 | 31.75 | 63.50 | 10.0 | 20 |
| 1,000 | 50 | 55.54 | 51.82 | 103.6 | 16.67 | 33⅓ |
| 1,000 | 50 | 85.05 | 79.36 | 158.7 | 25 | 50 |

160 per cent by weight of ethyl silicate to resin, or 50 per cent by weight of SiO₂ to resin were found to be the upper limits beyond which the binder solutions proved to be unsuitable for the production of the composite bonded mica insulation.

The following mechanism is considered to be a possible explanation of the modification of the bonding film at the point of contact with the mica surface. When the binder solution containing the resin and the ethyl silicate is applied to the layers of mica flakes, some of the colloidal silica and ethyl silicate remain on the surface of the binder films, while the remainder are interspersed with the binder. As the solvent evaporates from the surface a jelly-like layer of colloidal silica and some unchanged ethyl silicate is formed on the binder film. Then as the solvent comes forward from within the binder, it brings with it to the surface any ethyl silicate which has escaped decomposition by hydrolysis. Then as the binder film is further heated, the silica gel dries to a hard film.

Thus, there is believed to be an interfacial silica layer between the modified polyvinyl acetate layer and the mica layer. It has been suggested that the component flakes of a mica crystal are superficially held together by valence bonds on the surface of each flake. It is not unreasonable to suppose, then, that the interfacial silica valence could attach itself to the mica surface through these valance bonds to form an adhesive contact. Similarly, the polyvinyl acetate molecule contains double bonds, by means of which the interfacial silica molecule could attach itself to the resin film. There would thus be formed a continuous molecular structure between the resin layer and the mica layer. It is our belief that such an interfacial reaction does obtain and that this reaction accounts for the increase in adhesiveness of such a bonding layer over one composed of polyvinyl acetate or of the indicated equivalent resin alone.

In practice in producing the present composite mica insulation the mica flakes are layered on screens with the application of the mica binder in the form of a fluid composition over each successively applied layer of mica film. The viscosity of the binder and the volume thereof must be such as to effect complete wetting of the layers of mica films and a thorough distribution, and the resin content of the binder fluid must be controlled within suitable limits so as to prevent the incorporation of excessive bond content in the bonded product.

The National Electric Manufacturers' Association specifications include the following limits:

| | Type of material | Bond content |
|---|---|---|
| 1 | Moulding plate | Not over 16 per cent. |
| 2 | Cold flexible plate | Not over 20 per cent. |
| 3 | Heater plate | Not over 4 per cent. |

The present mica binder solution prepared as hereinbefore described lends itself to ease of application and proper distribution and wetting of the mica surfaces so that after the composite mica insulation has been thus built up to the desired thickness, the assembly is then subjected to a preliminary heating preferably under vacuum in order to remove the solvent from the binder solution. Then the assembly is subjected to heat and pressure, to effect the complete bonding of the mica films to each other, and the integration of the entire mass into a thoroughly bonded mica insulation.

The temperatures employed in connection with the production of the present bonded mica insulation may vary between the limits of 175° F. to 325° F. The pressures employed may vary between the limits of 50–500 pounds per square inch.

As above pointed out, the improved mica binder may be produced by modification with the foregoing proportions of ethyl silicate of not only the vinyl acetate resins, but also of those synthetic polymerized resins of the polystyrene type and the polyacrylic type, usually as polymethyl acrylate and polyethyl acrylate. If found desirable, known plasticizers may be utilized with the modifying resinous material, and the modified resins are preferably those having softening points ranging from 60 to 120° C.

While for most purposes it is preferred to produce the compounded bonded mica insulation by assembling successive layers of mica flakes as above described, nevertheless, viewed in its broader aspect the invention includes the production of bonded mica insulation utilizing other forms of sheet material with the mica flakes, such as Fiberglas, synthetic mica, and for some purposes various grades and types of cloth and paper.

The present composite mica insulation is particularly useful for the production of electrical insulation possessing high resistance to thermal deterioration; high dielectric strength, high electrical insulation resistance, and low loss factor; great stability to aging, heat, light, acids, alkalies, water, water vapor, corrosive vapors, and to the passage of fluids; ability to withstand the effects of corona discharge; and they are further characterized by permanence and compactness. The improved mica binder imparts to the product the foregoing characteristics superior to other composite mica insulation now on the market.

While the preferred embodiment of the invention has been herein illustrated and described, it is to be understood that the invention may be embodied in other forms within the scope of the following claims.

Having thus described the invention, what is claimed is:

1. A composite mica insulation capable of resisting high temperatures comprising a plurality of inorganic insulating layers including at least one layer comprising mica flakes, said layers being bonded together under heat at temperatures from 175° F. to 325° F. and pressure between 50 and 500 pounds per square inch into a unitary structure by a mica binder, said mica binder comprising the thermal reaction product of ethyl silicate and a resinous material containing at least one resin selected from the group consisting of polyvinyl acetate, partially hydrolyzed polyvinyl acetate, an acrylic resin, said ethyl silicate type and a polystyrene resin, said ethyl silicate being present from about 3.17% to about 31.75% of the weight of the resinous material, whereby the bond consists of the thermal reaction product of ethyl silicate and the selected resinous material.

2. A composite mica insulation capable of resisting high temperatures comprising a plurality of layers of inorganic insulating material, at least one layer comprising mica flakes, said layers being bonded together under heat at temperatures from 175° F. to 325° F. and pressure between 50 and 500 pounds per square inch into a unitary structure by a mica binder, said mica binder comprising the thermal reaction product of about 2.54 to 127.0 grams of ethyl silicate and about 80 grams of polyvinyl acetate, whereby the bond consists of a thermal reaction product of the ethyl silicate and the polyvinyl acetate.

3. A composite mica insulation capable of resisting high temperatures comprising a plurality of inorganic insulating layers including at least one layer comprising mica flakes, said layers being bonded together under heat at temperatures from 175° F. to 325° F. and pressure between 50 and 500 pounds per square inch into a unitary structure by a mica binder, said mica binder comprising the thermal reaction product of ethyl silicate and a resinous material containing at least one resin selected from the group consisting of polyvinyl acetate, partially hydrolyzed polyvinyl acetate, an acrylic resin of the polyacrylic type and a polystyrene resin, said ethyl silicate being present from about 3.17% to 158.7% of the weight of the resinous material, whereby the bond consists of the thermal reaction products of ethyl silicate and the selected resinous material.

4. A heat resisting bonded mica insulation in sheet form capable of being molded and capable of resisting high temperatures without deterioration, comprising: a plurality of inorganic insulating layers including at least one layer comprising mica flakes, said layers being bonded together under heat at temperatures from 175° F. to 325° F. and pressures between 50 and 500 lbs. per square inch into a unitary structure by a mica binder, said mica binder comprising the thermal-reaction product of polyvinyl acetate and ethyl silicate, said ethyl silicate being present in from about 3.17% to about 6.35% of the weight of the resinous material, the bond between contiguous mica flages being formed by the reaction product of the aforesaid polyvinyl acetate and ethyl silicate under the aforesaid heat and pressure and being further characterized by the freedom therefrom of any substantial quantities of free silica.

5. A heat resisting, flexible, bonded mica insulation, comprising: a plurality of inorganic insulating layers including at least one layer comprising mica flakes, said layers being bonded together under heat at temperatures from 175° F. to 325° F. and pressures between 50 and 500 lbs. per square inch into a unitary structure by a mica binder, said mica binder comprising about 5000 c. c. of a base solution consisting of polyvinyl acetate and ethyl silicate, said ethyl silicate being present in from about 3.17% to about 31.75% of the weight of the resinous material, about 6000 c. c. of alcohol, and about 700 c. c. dicarbitol phthalate, the bond between contiguous mica flakes being formed by the reaction product of the aforesaid polyvinyl acetate and ethyl silicate under the aforesaid heat and pressure.

WILLIS A. BOUGHTON.
CHESTER L. DAWES.
WILLIAM R. MANSFIELD.

REFERENCES CITED

The following references are of record in the file of this patent:

UNITED STATES PATENTS

| Number | Name | Date |
|---|---|---|
| 409,985 | Lee | Aug. 27, 1889 |
| 794,581 | Bachrach | July 11, 1905 |
| 2,195,254 | Miller | Mar. 26, 1940 |
| 2,258,218 | Rochow | Oct. 7, 1941 |
| 2,258,220 | Rochow | Oct. 7, 1941 |
| 2,299,552 | McGregor et al. | Oct. 20, 1942 |
| 2,300,812 | Reist | Nov. 3, 1942 |
| 2,317,891 | Dennison | Apr. 27, 1943 |

FOREIGN PATENTS

| Number | Country | Date |
|---|---|---|
| 550,760 | Great Britain | Jan. 22, 1943 |